(12) United States Patent
Nakata

(10) Patent No.: US 9,754,619 B1
(45) Date of Patent: Sep. 5, 2017

(54) OPTICAL DISC APPARATUS CONTROLLING IRRADIATION POSITION BASED ON CROSS-CORRELATION VALUE BETWEEN REPRODUCTION SIGNAL AND DECODED SIGNAL

(71) Applicant: Panasonic Intellectual Property Management Co., Ltd., Osaka (JP)

(72) Inventor: Kohei Nakata, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/335,835

(22) Filed: Oct. 27, 2016

(30) Foreign Application Priority Data

Mar. 7, 2016 (JP) .................................. 2016-042929

(51) Int. Cl.
| | |
|---|---|
| G11B 7/09 | (2006.01) |
| G11B 7/005 | (2006.01) |
| G11B 7/13 | (2012.01) |
| G11B 20/18 | (2006.01) |
| G11B 7/1353 | (2012.01) |
| G11B 20/10 | (2006.01) |
| G11B 7/0037 | (2006.01) |

(52) U.S. Cl.
CPC .............. *G11B 7/094* (2013.01); *G11B 7/005* (2013.01); *G11B 7/09* (2013.01); *G11B 7/0901* (2013.01); *G11B 7/0908* (2013.01); *G11B 7/13* (2013.01); *G11B 7/1353* (2013.01); *G11B 20/10398* (2013.01); *G11B 20/10462* (2013.01); *G11B 20/18* (2013.01); *G11B 7/0037* (2013.01)

(58) Field of Classification Search
None
See application file for complete search history.

(56) References Cited

U.S. PATENT DOCUMENTS

2007/0237059 A1* 10/2007 Kasahara ................. G11B 7/24
                                                                    369/124.1
2014/0341007 A1    11/2014 Sano et al.
2016/0284380 A1     9/2016 Nakata et al.

FOREIGN PATENT DOCUMENTS

WO      2014/057674      4/2014
WO      2015/107573      7/2015

* cited by examiner

*Primary Examiner* — Brian Butcher
(74) *Attorney, Agent, or Firm* — Wenderoth, Lind & Ponack, L.L.P.

(57) ABSTRACT

In an optical disc apparatus for reproducing information recorded on a track of an optical disc, an optical head irradiates a light beam onto the track, detects a reflected light reflected by the track, and generates a reproduction signal based on the reflected light. A decoder circuit decodes the reproduction signal, and generates a decoded signal including information recorded on the track. A correlation detector circuit calculates a cross-correlation value between the reproduction signal and the decoded signal. A servo circuit detects a deviation amount of an irradiation position of the light beam onto the track, from the reproduction signal, and controls the irradiation position of the optical head based on the cross-correlation value and the deviation amount.

10 Claims, 6 Drawing Sheets

OPTICAL DISC APPARATUS CONTROLLING IRRADIATION POSITION BASED ON CROSS-CORRELATION VALUE BETWEEN REPRODUCTION SIGNAL AND DECODED SIGNAL

CROSS-REFERENCE TO RELATED APPLICATION

This is an application, which claims priority to Japanese patent application No. JP 2016-042929 as filed on Mar. 7, 2016, the contents of which are incorporated herein by reference.

BACKGROUND OF THE DISCLOSURE

1. Field of the Disclosure

The present disclosure relates to an optical disc apparatus, that records data to an optical disc and reproduces data on an optical disc.

2. Description of the Related Art

A variety of types of optical discs such as DVDs or Blu-ray (registered trademark) discs (hereinafter referred to as BDs) are currently used as an information recording medium for storing video and data. From the viewpoint of space efficiency at the time of storage of data, techniques of improving a recording capacity per volume without increasing costs of an optical disc include techniques of improving a track density and techniques of improving a line density.

The technique of improving a track density includes a land (inter-groove)-groove (groove) recording and reproducing technique. This technique has been already used for DVD-RAMs and allows conventional data recoded only in grooves or lands to be recorded on both the groove and the land, and this leads to improvement of a track density. Additionally, a crosstalk cancelling technique is disclosed that reduces a crosstalk component from adjacent tracks (See Patent Document 1, for example). In this technique, a reflected light from an optical disc is divided into and detected as multiple regions, and multiple detected reproduction signals are combined into a reproduction signal with predetermined frequency characteristics by using a waveform equalizer and with the crosstalk component reduced. This technique can further improve the track density.

For a technique of improving a line density, a PRML (Partial Response Maximum Likelihood) signal processing technique is typically used. In order to stably produce the reproduction performance from the PRML signal processing technique, a PLL (Phase Locked Loop) technique capable of supporting a high line density is also used (See Patent Document 2, for example).

With these techniques, improvements have been made in recording capacity of the optical discs.

PRIOR ART DOCUMENTS

Patent Documents

Patent Document 1: WO 2014/057674 A1
Patent Document 2: WO 2015/107573 A1

SUMMARY OF THE DISCLOSURE

One non-limiting and exemplary embodiment provides an optical disc apparatus capable of stably reproducing data of an optical disc with a track density and a line density improved as compared with prior arts.

According to one aspect of the non-limiting and exemplary embodiment, there is provided an optical disc apparatus for reproducing information recorded on a track of an optical disc, and the optical disc apparatus includes an optical head, a decoder circuit, a correlation detector circuit, and a servo circuit. The optical head irradiates a light beam onto the track, detects a reflected light reflected by the track, and generates a reproduction signal based on the reflected light. The decoder circuit decodes the reproduction signal, and generates a decoded signal including information recorded on the track. The correlation detector circuit calculates a cross-correlation value between the reproduction signal and the decoded signal. The servo circuit detects a deviation amount of an irradiation position of the light beam onto the track, from the reproduction signal, and controls the irradiation position of the optical head based on the cross-correlation value and the deviation amount.

According to another aspect of the non-limiting and exemplary embodiment, there is provided an optical disc apparatus reproducing information recorded on a track of an optical disc, and the optical disc apparatus includes an optical head, a decoder circuit, a phase error detector circuit, and a servo circuit. The optical head irradiates a light beam onto the track, detects a reflected light reflected by the track, and generates a reproduction signal based on the reflected light. The decoder circuit decodes the reproduction signal, and generates a decoded signal including information recorded on the track. The phase error detector circuit calculates a phase error value between the reproduction signal and the decoded signal. The servo circuit detects a deviation amount of an irradiation position of the light beam onto the track, from the reproduction signal, and controls the irradiation position of the optical head based on the phase error value and the deviation amount.

According to the non-limiting and exemplary embodiment, the optical disc apparatus is provided, which is capable of stably reproducing data of an optical disc with a track density and a line density improved as compared with prior arts.

DETAILED DESCRIPTION OF THE EMBODIMENTS

Non-limiting and exemplary embodiments will now be described in detail with reference to the drawings as needed. It is noted that detailed description will not be provided more than necessary in some cases. For example, detailed description of already well-known facts and repeated description of substantially the same constituent components may not be provided. This is for the purpose of avoiding unnecessary redundancy of the following description and facilitating understanding by those skilled in the art.

The accompanying drawings and the following description are provided for sufficient understanding of this disclosure by those skilled in the art, and it is not intended to limit the subject matter described in the claims thereto.

First Embodiment

A non-limiting and exemplary embodiment will hereinafter be described with reference to FIGS. 1 to 6.

1-1. Configuration

Figure 1:
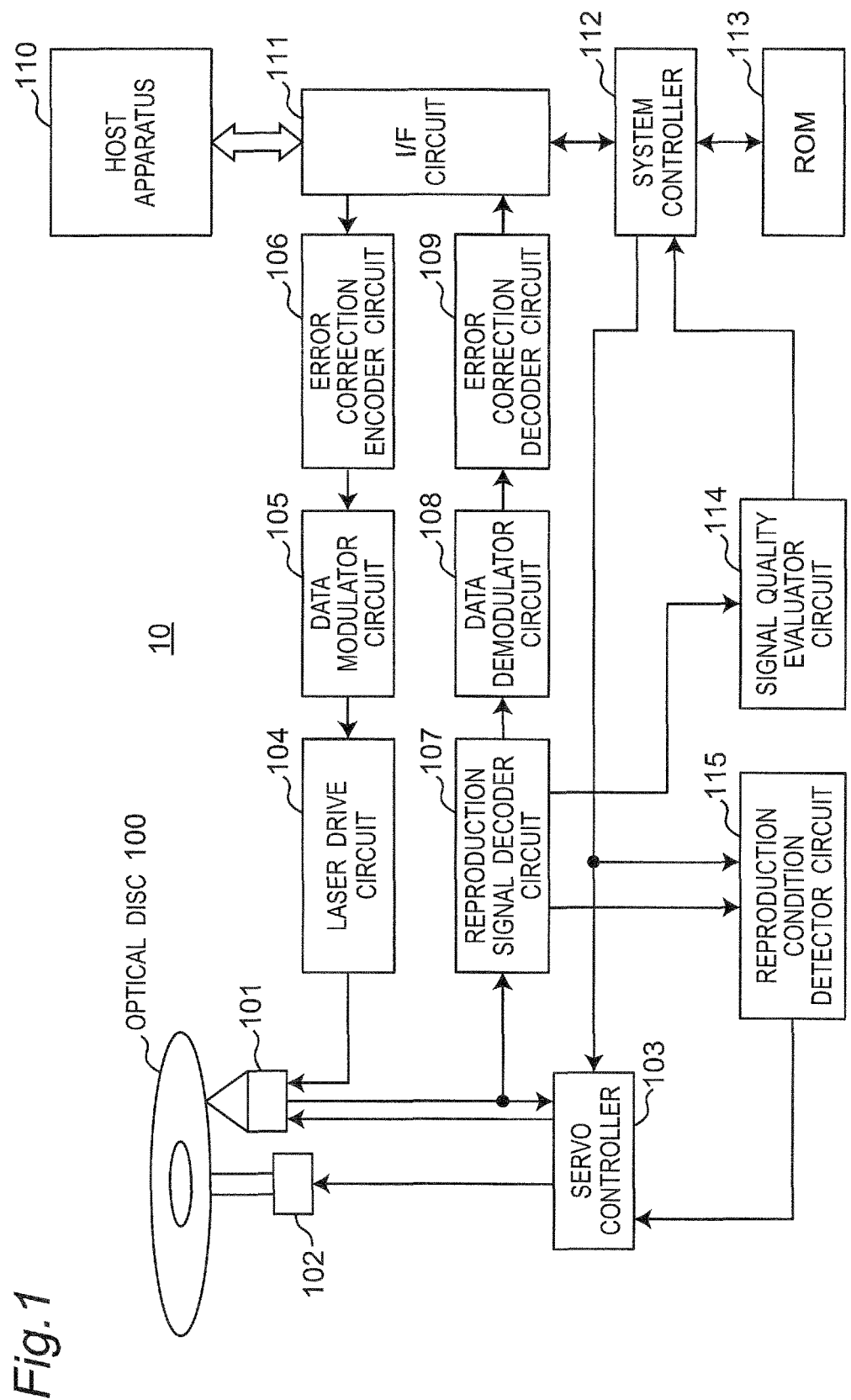
FIG. 1 is a block diagram of a configuration of an optical disc apparatus according to a first embodiment.

FIG. 1 is a block diagram of a configuration of an optical disc apparatus 10 according to the present embodiment. Referring to FIG. 1, the optical disc apparatus 10 includes an optical head 101, a spindle motor 102, a servo controller 103, a laser driving circuit 104, a data modulator circuit 105, an error correction encoder circuit 106, a reproduction signal decoder circuit 107, a data demodulator circuit 108, an error correction decoder circuit 109, a system controller 112, an interface circuit (hereinafter referred to as an I/F circuit) 111, a ROM (Read Only Memory) 113, a signal quality evaluator circuit 114, and a reproduction condition detector circuit 115.

The optical disc apparatus 10 records data onto an optical disc 100, or reproduces data on the optical disc 100 in accordance with recording or reproduction requests from a host apparatus 110. The optical disc 100 has tracks formed into a spiral shape from an inner circumference to an outer circumference. The tracks are made of groove tracks formed as grooves and land tracks formed between adjacent groove tracks. Data is recorded on both the groove tracks and the land tracks.

The spindle motor 102 rotates the optical disc 100. The optical head 101 irradiates a light beam of laser light onto the optical disc 100 so as to record data onto the optical disc 100, and to reproduce data from the optical disc 100.

The servo controller 103 controls the optical head 101 and the spindle motor 102 to perform control of condensing the light beam, which is irradiated from the optical head 101 onto the optical disc 100, to a track disposed on the optical disc 100 (focusing control), and movement control of accessing a destination track (tracking control). The servo controller 103 controls the position of the optical head 101 and the number of rotations of the spindle motor 102 based on a photodetection signal from the optical head 101, as well as a tracking detection value and a focus detection value (including a spherical aberration detection value) from the reproduction condition detector circuit 115, such that the optical head 101 scans the optical disc 100 at a predetermined linear velocity.

The I/F circuit 111 receives from the host apparatus 110, the recording data to be recorded onto the optical disc 100. The I/F circuit 111 sends to the host apparatus 110, the reproduction data reproduced from the optical disc 100.

The error correction encoding circuit 106 adds a parity for error correction to the recording data received via the I/F circuit 111 from the host apparatus 110.

The data modulator circuit 105 generates a modulated signal acquired by modulating the recording data including the parity from the error correction encoding circuit 106 in accordance with a predetermined modulation rule. This modulated signal is recorded on a track on the optical disc 100.

The laser driving circuit 104 converts the modulated signal into an optical pulse so as to accurately form a mark on the optical disc 100, and drives a blue semiconductor laser 207 (described later) of the optical head 101 by an optical driving signal of the converted optical pulse. The mark is formed on the optical disc 100 by the heat of the irradiated light beam.

On the other hand, the data recorded on the optical disc 100 is reproduced by the reproduction signal decoder circuit 107, the data demodulator circuit 108, and the error correction decoder circuit 109.

The optical head 101 irradiates a light beam onto a track of the optical disc 100, and detects a reflected light from the optical disc 100. The optical head 101 outputs an electric signal generated based on the detected reflected light as a reproduction signal. The reproduction signal decoder circuit 107 decodes the reproduction signal outputted by the optical head 101, and generates a decoded signal Sd. Specifically, the reproduction signal decoder circuit 107 generates the decoded signal Sd by a PRML signal process. In other words, the reproduction signal decoder circuit 107 compares a waveform of one combined signal obtained by combining the reproduction signals S(Ch1) to S(Ch6), with expected value waveforms, to select the expected value waveform which is the closest to the waveform of the combined signal, and outputs as the decoded signal Sd, a binary signal on which the selected expected value waveform is based, namely, which is an original signal of the selected expected value waveform. By using a condition of a width of inter-symbol interference made longer, a reproduction performance corresponding to a higher line density can be acquired. In order to improve the track density, a crosstalk cancelling technique is used that reduces a crosstalk component from adjacent tracks.

The data demodulator circuit 108 demodulates the decoded signal Sd to generate recording data in accordance with the predetermined modulation rule.

The error correction decoder circuit 109 corrects an error in the demodulated recording data to restore the correct recording data.

The ROM 113 is made of a flash memory. The ROM 113 stores a program for the system controller 112 for controlling the entire optical disc apparatus 10.

The system controller 112 reads out the program stored in the ROM 113, and then, executes the same program to control the circuits and control the communication with the host apparatus 110. In FIG. 1, for convenience, the arrows from the system controller 112 to the constituent components are not shown except those to the servo controller 103 and the reproduction condition detector circuit 115.

The signal quality evaluator circuit 114 measures qualities such as distortion and variations in amplitude of the reproduction signals S(Ch1) to S(Ch6) while using the decoded signal Sd outputted from the reproduction signal decoder circuit 107. For a signal quality evaluation technique corresponding to the PRML signal processing technique, an MLSE (Maximum Likelihood Sequential Error) index is used. The MLSE index indicates a quantitative evaluation of the magnitude of the error between the waveform of one combined signal obtained by combining the reproduction signal S(Ch1) to S(Ch6) and the selected expected value waveform. The MLSE index enables the evaluation of a condensed state of the light beam onto the optical disc 100, and a recording state of marks recorded on the tracks.

The reproduction condition detector circuit 115 detects a direction and an amount of deviation in the condensed state of the light beam on the optical disc 100, based on the decoded signal outputted from the reproduction signal decoder circuit 107 and a plurality of reproduction signals S(Ch1) to S(Ch6) corresponding to the crosstalk cancelling technique.

The detailed configurations of the optical head 101, the reproduction signal decoder circuit 107, and the reproduction condition detector circuit 115 corresponding to the crosstalk cancelling technique will be described with reference to FIGS. 2 and 3.

Figure 2:
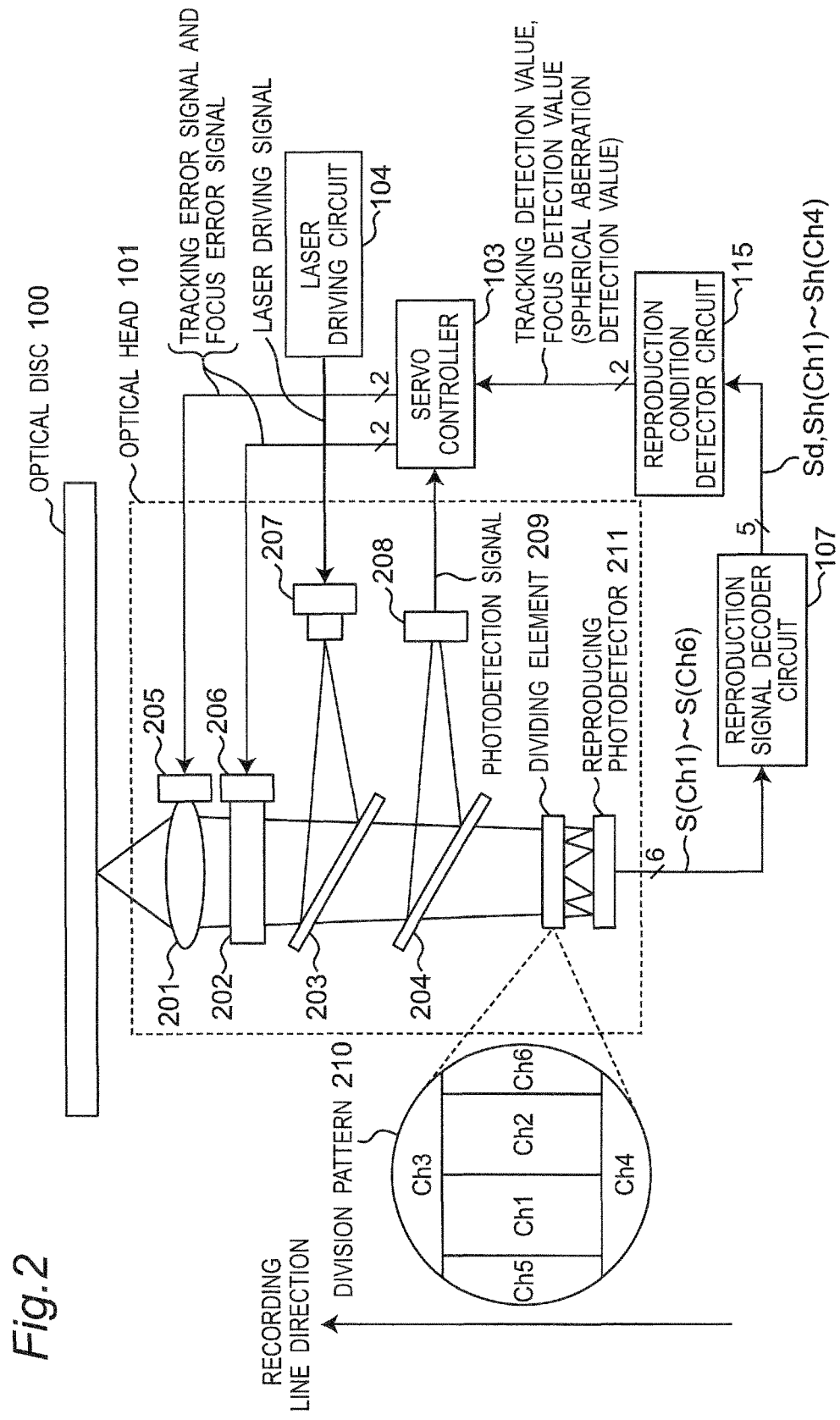
FIG. 2 is a block diagram of a configuration of an optical head of FIG. 1.

FIG. 2 is a block diagram of a configuration of the optical head 101 of FIG. 1. Referring to FIG. 2, the optical head 101 includes an objective lens 201, a collimator lens 202, a laser mirror 203, a beam splitter 204, an objective lens controller 205, a collimator lens controller 206, a blue semiconductor laser 207, a controlling photodetector 208, a dividing element 209, and a reproducing photodetector 211.

The blue semiconductor laser 207 emits a light beam of 405 nm in wavelength in accordance with a laser driving signal. The light beam is reflected by the laser mirror 203 and made incident on the collimator lens 202. The light beam is converted through the collimator lens 202 into a parallel light, which is condensed by the objective lens 201 and made incident onto a track of the optical disc 100.

The reflected light reflected and diffracted on the track of the optical disc 100 is transmitted through the objective lens 201, the collimator lens 202, and the laser mirror 203. The beam splitter 204 splits the reflected light transmitted through the laser mirror 203 into two directions. In particular, the beam splitter 204 reflects a portion of the reflected light, and transmits the remainder. The controlling photodetector 208 receives and detects the light reflected by the beam splitter 204, and outputs a photodetection signal to the servo controller 103. The dividing element 209 divides the light transmitted through the beam splitter 204 into multiple directions. The reproducing photodetector 211 receives each of the lights divided by the dividing element 209.

Based on the photodetection signal from the controlling photodetector 208, the servo controller 103 generates a focus error signal and a tracking error signal. The focus error signal and the tracking error signal are examples of a signal indicative of a deviation amount of the irradiation position of the light beam onto the track. The servo controller 103 uses the focus error signal and the tracking error signal, and generates a focus control signal and a tracking control signal such that respective errors become smaller. The objective lens controller 205 drives the objective lens 201 based on these two control signals to perform a focusing operation and a tracking operation. The collimator lens controller 206 drives the collimator lens 202 to control the position based on these two control signals so as to control the spherical aberration in the condensed state onto the track of the optical disc 100.

The dividing element 209 acts as a diffraction grating because of fine grooves formed on a surface. The dividing element 209 has a division pattern 210 having six regions Ch1 to Ch6 acquired by dividing the region of entrance of the reflected light from the optical disc 100. The reflected light is transmitted through the respective regions, and is divided into different directions by the diffraction grating. The reproducing photodetector 211 has six light-receiving regions receiving respective six reflection lights transmitted and divided through the regions of the dividing element 209. The reproducing photodetector 211 generates six reproduction signals S(Ch1) to S(Ch6) in accordance with an amount of light received by each of the light-receiving regions. The division pattern 210 is divided into a region Ch3 and a region Ch4 at both respective ends in a recording line direction (track direction). The division pattern 210 is divided into a region Ch1 and a region Ch2 in a central portion and a region Ch5 and a region Ch6 at both ends in a radial direction that is a direction perpendicular to the recording line direction. The region Ch1 and the region Ch2 are arranged on both respective sides across the center of the dividing element 209 in the radial direction. In other words, the region Ch1 and the region Ch2 are one and the other regions of the central portion of the dividing element 209 divided into left and right regions relative to the recording line direction. The region Ch5 is located on the outside of the region Ch1 in the radial direction, to be adjacent to the region Ch1. The region Ch6 is located on the outside of the region Ch2 in the radial direction, to be adjacent to the region Ch2. In the following description, a reproduction signal, which is a signal of the light received and outputted by the light-receiving region of the reproducing photodetector 211 after the light passes through the region Ch1, will be referred to as a reproduction signal S(Ch1) of the region Ch1. The same applies to the reproduction signals of the other regions.

The reproduction signal decoder circuit 107 performs a predetermined arithmetic operation on these six reproduction signals S(Ch1) to S(Ch6) generated by the reproducing photodetector 211, to combine the same six reproduction signals S(Ch1) to S(Ch6), and this leads to decoding of the modulated signal recorded on the target track, and generation of the decoded signal Sd while reducing the crosstalk components included in the six reproduction signals S(Ch1) to S(Ch6).

Figure 3:
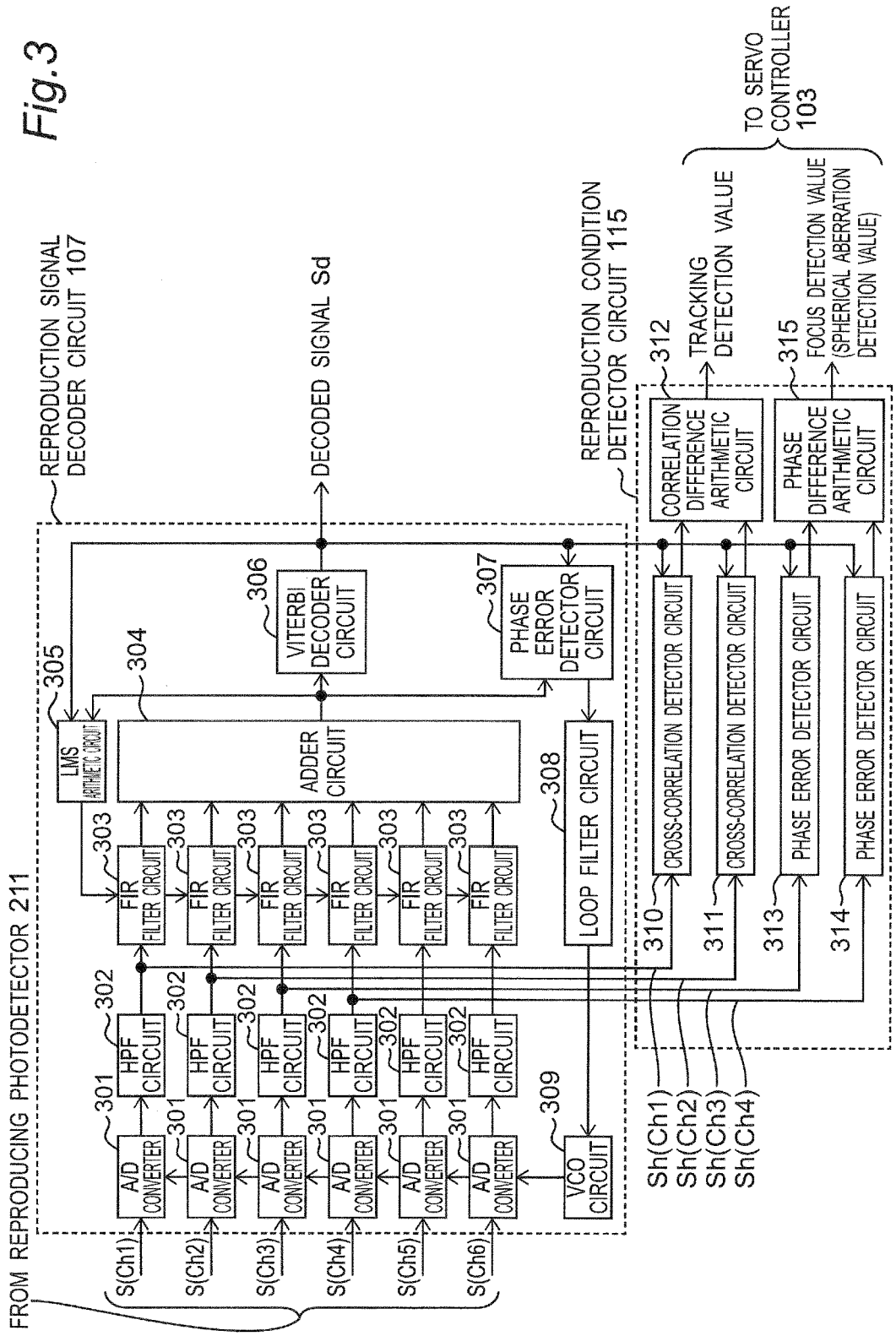
FIG. 3 is a block diagram of configurations of a reproduction signal decoder circuit and a reproduction condition detector circuit of FIG. 1.

FIG. 3 is a block diagram of configurations of the reproduction signal decoder circuit 107 and the reproduction condition detector circuit 115 of FIG. 1.

Referring to FIG. 3, the reproduction signal decoder circuit 107 includes A/D converters 301, HPF (High Pass Filter) circuits 302, FIR (Finite Impulse Response) filter circuits 303, an adder circuit 304, an LMS (Least Mean Square) arithmetic circuit 305, a Viterbi decoder circuit 306, a phase error detector circuit 307, a loop filter circuit 308, and a voltage-controlled oscillator circuit (hereinafter referred to as a VCO circuit) 309. In this case, the reproduction signal decoder circuit 107 includes the six A/D converters 301, the six HPF circuits 302, and the six FIR filter circuits 303, where the number of six is in conformity to the number of the reproduction signals S(Ch1) to S(Ch6) outputted by the reproducing photodetector 211.

Each of the A/D converters 301 converts each of the six reproduction signals S(Ch1) to S(Ch6) generated by the reproducing photodetector 211 into a digital signal.

Each of the HPF circuits 302 reduces a disturbance component included in the digital signal outputted from the A/D converter 301 in a frequency band lower than the frequency band of the recorded modulated signal, and then, outputs a digital signal with the disturbance component reduced.

Each of the FIR filter circuits 303 performs waveform equalization for each of the six digital signals outputted from the HPF circuits 302. The adder circuit 304 adds the six digital signals outputted from the FIR filter circuits 303 to synthesize one digital signal. The Viterbi decoder circuit 306 binarizes the synthesized digital signal by Viterbi decoding, and outputs the binarized decoded signal Sd. The LMS arithmetic circuit 305 controls tap coefficients of each of the FIR filter circuits 303. The LMS arithmetic circuit 305 controls the tap coefficients of each of the FIR filter circuits 303 to make an error smaller, between an expected value waveform obtained from the decoded signal Sd outputted from the Viterbi decoder circuit 306, and the digital signal synthesized by the adder circuit 304. The FIR filter circuits 303 operate as adaptive equalization filters. As a result, from the six digital signals, the reproduction signal decoder circuit 107 synthesizes the digital signal reduced in the crosstalk component and waveform-equalized to have frequency characteristics equal to the expected value waveform.

From the digital signal synthesized by the adder circuit 304 and the decoded signal Sd, the phase error detector circuit 307 detects a phase error value in a sampling phase of the ideal digital signal in the Viterbi decoder circuit 306. The loop filter circuit 308 converts the detected phase error value into a control signal for controlling a frequency of a sampling clock. The VCO circuit 309 generates a sampling clock having a frequency corresponding to the control signal outputted from the loop filter circuit 308. The generated sampling clock is used as a clock indicative of the sampling timing of the A/D converters 301 and the operation timing of the subsequent circuits.

With the above configuration, the reproduction signal decoder circuit 107 reduces the noise components including the crosstalk components from the digital signals, corrects the frequency characteristics of waveforms, and corrects the sampling phase so as to achieve optimum conditions for the decoding process of the Viterbi decoder circuit 306.

The reproduction condition detector circuit 115 includes cross-correlation detector circuits 310 and 311, a correlation difference arithmetic circuit 312, phase error detector circuits 313 and 314, and a phase difference arithmetic circuit 315. Based on the reproduction signals S(Ch1) to S(Ch6) of the respective regions, the reproduction condition detector circuit 115 generates and outputs the tracking detection value, the focus detection value, and the spherical aberration detection value. The tracking detection value, the focus detection value, and the spherical aberration detection value indicate reproduction conditions, i.e., a direction and an amount of deviation in the condensed state of the light beam on the optical disc 100. These values indicative of the reproduction conditions are used in the servo controller 103 for the tracking control and the focusing control.

The cross-correlation detector circuit 310 detects a cross-correlation value between the reproduction signal S(Ch1) of the region Ch1, which is one of the two regions of the central portion in the division pattern 210 of the dividing element 209, and the decoded signal Sd. It is noted that the reproduction signal of the region Ch1 used for detecting the cross-correlation value in this case is a reproduction signal Sh(Ch1) after the reproduction signal S(Ch1) of the region Ch1 is subjected to the digitization by A/D converter 301 and the noise suppression by the HPF circuit 302. In the description of the reproduction condition detector circuit 115, the same operation is applied to the reproduction signals S(Ch2) to S(Ch4) of the other regions, and the reproduction signals from the HPF circuits 302 are denoted by Sh(Ch2) to Sh(Ch4). In a manner similar to that of above, the cross-correlation detector circuit 311 detects a cross-correlation value between the reproduction signal Sd(Ch2) of the region Ch2, which is the other one of the two regions of the central portion in the division pattern 210, and the decoded signal Sd.

The correlation difference arithmetic circuit 312 calculates a difference between the two cross-correlation values detected by the cross-correlation detector circuit 310 and the cross-correlation detector circuit 311. A desirable condition for the reproduction process in the reproduction signal decoder circuit 107 is a state in which the component of the recorded modulated signal is equally contained in the two reproduction signals of the central portion divided into left and right regions relative to the recording line direction of the track, i.e., the reproduction signal Sh(Ch1) of the region Ch1 and the reproduction signal Sh(Ch2) of the region Ch2. In this state, the difference between the two cross-correlation values calculated by the correlation difference arithmetic circuit 312 is zero. When the position of the light beam irradiated onto the track deviates in a direction perpendicular to the recording line direction of the track, a difference is generated in magnitude of the component of the modulated signal contained in the two reproduction signals Sh(Ch1) and Sh(Ch2) of the central portion, and the difference between the two cross-correlation values calculated by the correlation difference arithmetic circuit 312 is no longer zero. Therefore, the difference between the two cross-correlation values indicates the deviation of the tracking position from the desirable condition for the reproduction process. Thus, the difference in the cross-correlation value can be used as the tracking detection value for the tracking control.

The phase error detector circuit 313 detects a phase error value to the sampling phase of the ideal digital signal in the Viterbi decoder circuit 306, from the reproduction signal Sh(Ch3) of the region Ch3, which is one of the regions at both ends in the recording line direction of the track in the division pattern 210 of the dividing element 209, and the decoded signal Sd. In a manner similar to that of above, the phase error detector circuit 314 detects a phase error value from the reproduction signal Sh(Ch4) of the region Ch4, which is the other one of the regions at both ends in the recording line direction of the track in the division pattern 210, and the decoded signal Sd. A phase error detection method of the phase error detector circuit 313 and the phase error detector circuit 314 is similar to that of the phase error detector circuit 307 for controlling the sampling clock. Therefore, the phase error value can highly accurately be detected even at a high line density. The phase error values detected by the phase error detector circuit 313 and the phase error detector circuit 314 indicate the phases of the reproduction signal Sh(Ch3) of the region Ch3 and the reproduction signal Sh(Ch4) of the region Ch4, respectively, on the basis of the sampling clock controlled by the reproduction signal decoder circuit 107.

The phase difference arithmetic circuit 315 obtains a difference between the two phase error values detected by the phase error detector circuit 313 and the phase error detector circuit 314. When the focus position of the light beam irradiated onto the track deviates, the phases of the reproduction signal Sh(Ch3) of the region Ch3 and the reproduction signal Sh(Ch4) of the region Ch4 change in the directions opposite to each other. In addition, when a spherical aberration occurs, the respective phases change in the directions opposite to each other. Therefore, the difference between the two phase error values indicates the deviation of the focus position from the desirable condition for the reproduction process, and the occurrence of the spherical aberration. Thus, the difference in the phase error value can be used as the focus detection value, and can be used as the spherical aberration detection value.

1-2. Operation

The operation of the optical disc apparatus 10 according to the present embodiment will be described.

The description will first be made of an operation when the optical disc 100 is loaded into the optical disc apparatus 10 according to the present embodiment. When the optical disc 100 is loaded into the optical disc apparatus 10, the system controller 112 makes an adjustment for performing the focusing control and the tracking control optimum for the loaded optical disc 100. Therefore, the optical disc apparatus 10 operates the servo controller 103 to reproduce a track having data preliminarily recorded on the optical disc 100.

While controlling the servo controller 103 to operate the objective lens controller 205, the system controller 112 measures the MLSE index with the signal quality evaluator circuit 114 to search for an optimum point of the focus position and an optimum point of the tracking position, i.e., the position of the objective lens 201 at which the MLSE index is minimized. Additionally, while controlling the servo controller 103 to operate the collimator lens controller 206, the system controller 112 measures the MLSE index with the signal quality evaluator circuit 114 to search for an optimum point of the spherical aberration, i.e., the position of the collimator lens 202 at which the MLSE index is minimized.

The cross-correlation detector circuit 310 detects the cross-correlation value for the reproduction signal Sh(Ch1) of the region Ch1 at the optimum points of the focus position, the tracking position, and the spherical aberration. In a manner similar to that of above, the cross-correlation detector circuit 311 detects the cross-correlation value for the reproduction signal Sh(Ch2) of the region Ch2. The correlation difference arithmetic circuit 312 obtains and outputs a difference between the cross-correlation values detected by the cross-correlation detector circuit 310 and the cross-correlation detector circuit 311, as the tracking detection value. The phase error detector circuit 313 detects the phase error value for the reproduction signal of the region Ch3. The phase error detector circuit 314 detects the phase error value for the reproduction signal Sh(Ch4) of the region Ch4. The phase difference arithmetic circuit 315 calculates and outputs a difference between the phase error values detected by the phase error detector circuit 313 and the phase error detector circuit 314, as the focus detection value and the spherical aberration detection value. The system controller 112 sets the tracking detection value, the focus detection value, and the spherical aberration detection value as the values at the optimum points. In recording and reproduction for the loaded optical disc 100, the optical disc apparatus 10 uses the value at the optimum points set in this operation as a target value for performing the focusing control and the tracking control. Therefore, in the calculation processes in the correlation difference arithmetic circuit 312 and the phase difference arithmetic circuit 315, a deviation amount is obtained from the optimum points set in this operation. The servo controller 103 performs the focusing control and the tracking control to make this deviation amount smaller.

A recording operation of the optical disc apparatus 10 according to the present embodiment onto the optical disc 100 will be described.

The I/F circuit 111 acquires recording data transmitted from the host apparatus 110 and a logical address of a recording destination on the optical disc 100. The I/F circuit 111 divides the recording data into data blocks in predetermined units, and sends each of the data blocks to the error correction encoding circuit 106.

The error correction encoding circuit 106 adds a parity code for correcting an error at the time of reproduction to the recording data for each of the data blocks. The data modulator circuit 105 modulates the recording data having the parity codes added thereto into the modulated signal in accordance with the predetermined modulation rule. In order to accurately form a recording mark on the optical disc 100, the laser driving circuit 104 converts the modulated signal into a signal of castle type pulse waveform, and outputs the waveform to the blue semiconductor laser 207 of the optical head 101, as the driving signal for driving the blue semiconductor laser 207. The blue semiconductor laser 207 of the optical head 101 irradiates a laser pulse in accordance with to the driving signal onto the position on the optical disc 100 corresponding to the logical address of the recording destination. As a result, the mark corresponding to the modulated signal is recorded on the track of the optical disc 100.

The system controller 112 controls the recording operation described above. The system controller 112 determines a position of recording on the optical disc 100 based on the logical address of the recording destination acquired by the I/F circuit 111, and controls the servo controller 103 to move the optical head 101 to a destination position. The system controller 112 operates the error correction encoding circuit 106 before the optical head 101 arrives at the track that is the destination position, and operates the data modulator circuit 105 and the laser driving circuit 104 for recording when arriving at the target position.

The reproduction operation of the optical disc apparatus 10 according to the present embodiment will be described.

The operation of identifying a reproduction position on the optical disc 100 is similar to that of identifying a recording position in the recording operation. When the optical head 101 arrives at a position of a recording block to be reproduced, the system controller 112 operates the reproduction signal decoder circuit 107, the data demodulator circuit 108, and the error correction decoder circuit 109 to reproduce data.

The reproduction signal decoder circuit 107 compares a waveform of one combined signal obtained by combining the reproduction signals Sh(Ch1) to Sh(Ch6), with the expected value waveforms, to select the expected value waveform which is the closest to the waveform of the combined signal, and outputs as the decoded signal Sd a binary signal on which the selected expected value waveform is based, namely, which is an original signal of the selected expected value waveform. The data demodulator circuit 108 demodulates the decoded signal Sd to generate recording data in accordance with the predetermined modulation rule. The error correction decoder circuit 109 corrects an error in the demodulated recording data for restoration and transmits the data via the I/F circuit 111 to the host apparatus 110.

During the reproduction operation, the system controller 112 controls the servo controller 103 such that the tracking detection value, the focus detection value, and the spherical aberration detection value detected by the reproduction condition detector circuit 115 become closer, respectively, to the target values obtained at the time of loading of the optical disc 100 into the optical disc apparatus 10, to drive the objective lens 201 and the collimator lens 202.

In the method of controlling the objective lens 201 from the focus error signal and the tracking error signal generated based on an electric signal detected by the controlling photodetector 208, it is difficult to continuously perform control with high accuracy in accordance with the optimum condition for the reproduction process in the reproduction signal decoder circuit 107. The optical disc apparatus 10 of the present embodiment can perform control in accordance with the condition more suitable to the reproduction process executed by the reproduction signal decoder circuit 107, by using the tracking detection value, the focus detection value, and the spherical aberration detection value detected by the reproduction condition detector circuit 115.

Figure 4:
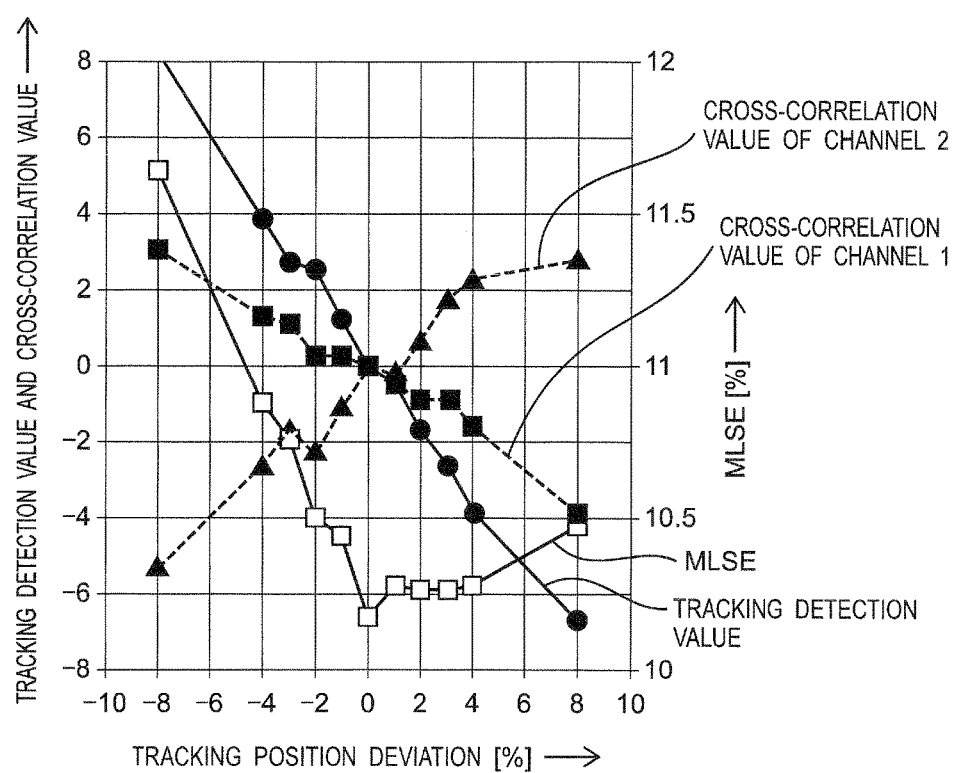
FIG. 4 is a graph of a relationship of a tracking detection value to a tracking position deviation in the optical disc apparatus of FIG. 1.

FIG. 4 shows a relationship of the MLSE index value, the cross-correlation value between each of the reproduction signals Sh(Ch1), (Ch2) of the regions Ch1, Ch2 and the decoded signal Sd, and the tracking detection value, to the tracking position deviation in the optical disc apparatus of FIG. 1. Referring to FIG. 4, the condition corresponding to the smallest MLSE index value is used as a reference position of the tracking position deviation, and an offset is set such that each of the cross-correlation values becomes zero on this condition. For the tracking position deviation, the two cross-correlation values between the reproduction signal Sh(Ch1) of the region Ch1 and the reproduction signal Sh(Ch2) of the region Ch2 change in such a relationship that, as one cross-correlation value becomes larger, the other cross-correlation value becomes smaller. By performing the tracking control based on the tracking detection value that is the difference between these two cross-correlation values, the tracking position deviation can accurately be detected. Therefore, it can be understood that the tracking position may be corrected in the direction toward the tracking detection value of zero.

Figure 5:
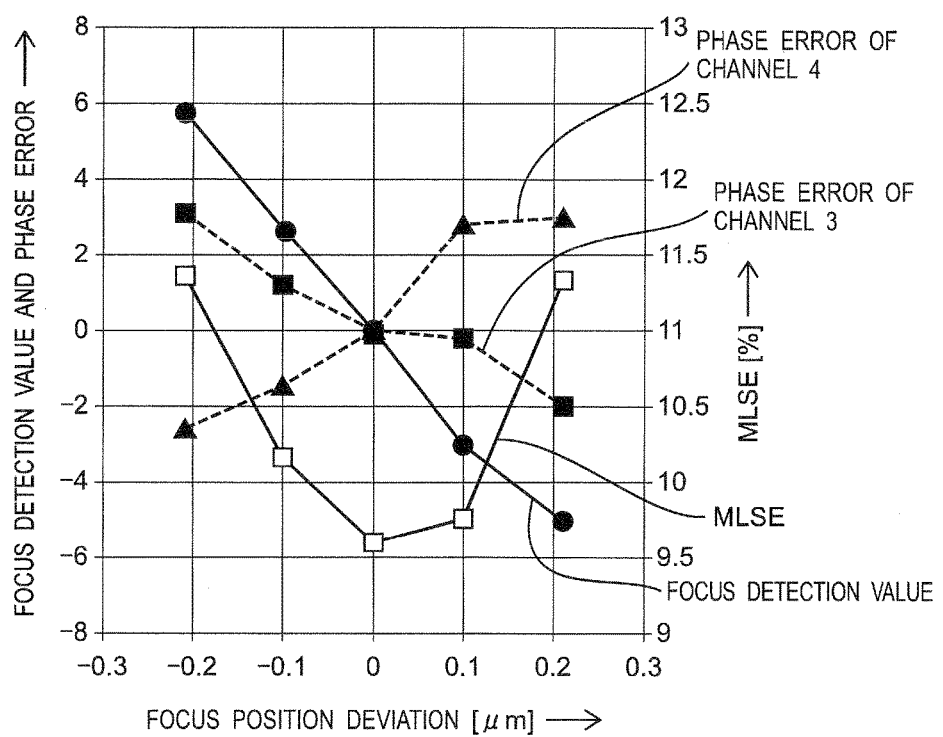
FIG. 5 is a graph of a relationship of a focus detection value to a focus position deviation in an optical disc apparatus of FIG. 1.

FIG. 5 shows a relationship of the MLSE index value, the phase error value between each of the reproduction signals Sh(Ch3), Sh(Ch4) of the regions Ch3, Ch4, and the focus detection value, to the focus position deviation in the optical disc apparatus of FIG. 1. Referring to FIG. 5, the condition corresponding to the smallest MLSE index value is used as a reference position of the focus position deviation, and an offset is set such that each of the cross-correlation values becomes zero on this condition. For the focus position deviation, the respective phase error values between the reproduction signal Sh(Ch3) of the region Ch3 and the reproduction signal Sh(Ch4) of the region Ch4 change in such a relationship that, as one phase error value is advanced, the other phase error value is delayed. By performing the focus control based on the focus detection value that is the difference between these two phase error values, the focus position deviation can accurately be detected. Therefore, it can be understood that the focus position may be corrected in the direction toward the focus detection value of zero.

Figure 6:
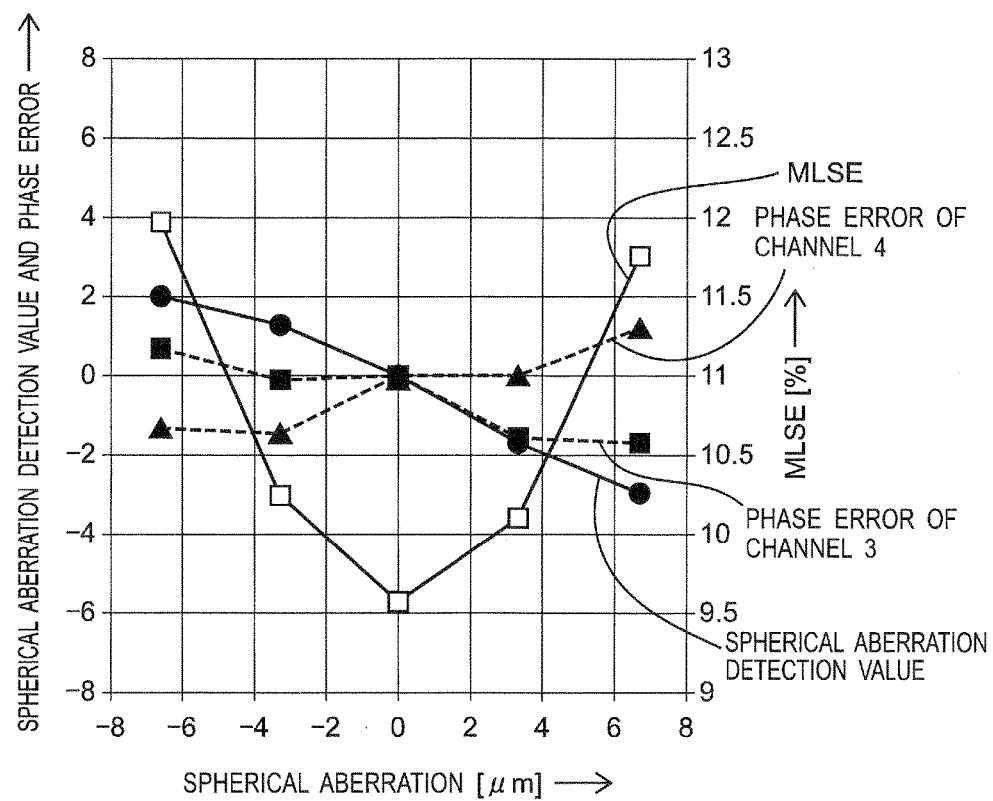
FIG. 6 is a graph of a relationship of a spherical aberration detection value to a collimator lens position deviation in the optical disc apparatus of FIG. 1.

FIG. 6 shows a relationship of the MLSE index value, the phase error value between each of the reproduction signals Sh(Ch3) and Sh(Ch4) of the regions Ch3 and Ch4, and the spherical aberration detection value, to the spherical aberration as is the case with the focus position deviation in the optical disc apparatus of FIG. 1. The spherical aberration detection value is the same as the focus detection value. For example, when the position of the collimator lens 202 is corrected in advance to the optimum point of the spherical aberration, a detection value calculated by the phase difference arithmetic circuit 315 can be used as the focus detection value to control the focus position by the objective lens controller 205. Conversely, when a control performance without a significant deviation is ensured by the control based on the focus error signal detected by the controlling photodetector 208 in terms of the focus position, a detection value calculated by the phase difference arithmetic circuit 315 can be used as the spherical aberration detection value to perform control such that the spherical aberration due to the collimator lens controller 206 is minimized.

1-3. Advantageous Effects and the Like

As described above, in the present embodiment, the optical disc apparatus 10 reproduces information recorded on a track of the optical disc 100. The optical disc apparatus 10 includes the optical head 101 for irradiating a light beam onto the track, detecting a reflected light reflected by the track and outputting the reproduction signals S(Ch1) to S(Ch6) based on the reflected light; the reproduction signal decoder circuit 107 for decoding the reproduction signal S(Ch1) to S(Ch6), and generating the decoded signal Sd including information recorded on the track; the reproduction condition detector circuit 115 for calculating a cross-correlation value between the reproduction signals Sh(Ch1) to Sh(Ch6) and the decoded signal Sd; and the servo controller 103 for detecting a deviation amount of an irradiation position of the light beam onto the track from a photodetection signal, and controlling the irradiation position of the optical head 101 based on the cross-correlation value and the deviation amount.

The optical disc apparatus 10 according to the present disclosure is provided for reproducing information recorded on a track of the optical disc 100. The optical disc apparatus 10 includes the optical head 101 for irradiating a light beam onto the track and detecting a reflected light reflected by the track and generating a reproduction signal based on the reflected light; the reproduction signal decoder circuit 107 for decoding the reproduction signals S(Ch1) to S(Ch6) and generating the decoded signal Sd including the information recorded on the track; the phase error detector circuits 313 and 314 for calculating a phase error value between the reproduction signals Sh(Ch1) to Sh(Ch6) and the decoded signal Sd from the reproduction signal decoder circuit 107; and the servo controller 103 for detecting a deviation amount of an irradiation position of the light beam onto the track from a photodetection signal to control the irradiation position of the optical head 101 based on the phase error value and the deviation amount.

As a result, stability and accuracy can be ensured in the control of the reproduction condition necessary for improving a track density and a line density. Therefore, the data of the optical disc 100 can stably be reproduced as compared with the conventional techniques.

Other Embodiments

The embodiment has been described as an exemplification of the techniques disclosed in the present disclosure. However, the techniques of the present disclosure are not limited thereto, and can be applied to embodiments with modification, replacement, addition, omission, etc. made as appropriate. The constituent components described in the embodiment can be combined to form a new embodiment.

Therefore, the other embodiments will hereinafter exemplarily be described.

In the embodiment described above, when the optical disc 100 is loaded into the optical disc apparatus 10, the optimum points of the focus position, the tracking position, and the spherical aberration are searched for, and then, the tracking detection value, the focus detection value, and the spherical aberration detection value at the respective optimum points are used as the target values to control the servo controller 103 in the reproduction operation such that the tracking detection value, the focus detection value, and the spherical aberration detection value become closer, respectively, to the target values in the described configuration. The optical disc apparatus 10 may control the servo controller 103 by using the cross-correlation value and the phase error value at the optimum points as the target values such that the cross-correlation value and the phase error value become closer, respectively, to the target values in the reproduction operation.

The servo controller 103 controls the irradiation position based on a difference between the two calculated cross-correlation values in the embodiment described above. However, the present disclosure is not limited to this. The irradiation position may be controlled based on a division value (a value indicative of a deviation amount from one) of the calculated two cross-correlation values.

The servo controller 103 controls the irradiation position based on a difference between the calculated two phase error values in the embodiment described above. However, the present disclosure is not limited to this. The irradiation position may be controlled based on a division value (a value indicative of a deviation amount from one) of the calculated two phase error values.

In the embodiment described above, the servo controller 103 may be configured to execute at least one of the processes of:

(1) performing the tracking control based on the tracking detection value of the light beam based on a difference between a plurality of cross-correlation values from the correlation difference arithmetic circuit 312;

(2) controlling the focus position of the light beam based on the focus detection value based on a difference between a plurality of phase error values from the phase difference arithmetic circuit 315; and (3) correcting the spherical aberration of the light beam based on the spherical aberration detection value that is the focus detection value based on a difference between a plurality of phase error values from the phase difference arithmetic circuit 315.

The present disclosure can be applied to an optical disc apparatus recording and reproducing data on an optical disc.

What is claimed is:

1. An optical disc apparatus for reproducing information recorded on a track of an optical disc, the optical disc apparatus comprising:
   an optical head that irradiates a light beam onto the track, detects a reflected light reflected by the track, and generates a reproduction signal based on the reflected light;
   a decoder circuit that decodes the reproduction signal, and generates a decoded signal including information recorded on the track;
   a correlation detector circuit that calculates a cross-correlation value between the reproduction signal and the decoded signal; and
   a servo circuit that detects a deviation amount of an irradiation position of the light beam onto the track, from the reproduction signal, and controls the irradiation position of the optical head based on the cross-correlation value and the deviation amount.

2. The optical disc apparatus as claimed in claim 1,
   wherein the optical head comprises:
   a dividing element that receives the reflected light, and generates a plurality of diffracted lights in a plurality of diffraction regions from the received reflected light, and
   a photodetector that receives the plurality of diffracted lights of the dividing element, and detects a plurality of reproduction signals based on respective light amounts of the plurality of received diffracted lights,
   wherein the correlation detector circuit calculates a cross-correlation value between each of the plurality of reproduction signals and the decoded signal, and
   wherein the servo circuit controls the irradiation position based on a plurality of calculated cross-correlation values.

3. The optical disc apparatus as claimed in claim 2,
   wherein the dividing element includes first and second regions symmetrically divided in a direction perpendicular to a recording line direction of the track, and
   wherein the servo circuit controls the irradiation position in the direction perpendicular to the recording line direction of the track based on a difference or a division value between first and second cross-correlation values, where the first cross-correlation value is obtained from a first reproduction signal detected from the first region and the decoded signal, and the second cross-correlation value is obtained from a second reproduction signal detected from the second region and the decoded signal.

4. An optical disc apparatus reproducing information recorded on a track of an optical disc, the optical disc apparatus comprising:
   an optical head that irradiates a light beam onto the track, detects a reflected light reflected by the track, and generates a reproduction signal based on the reflected light;
   a decoder circuit that decodes the reproduction signal, and generates a decoded signal including information recorded on the track;
   a phase error detector circuit that calculates a phase error value between the reproduction signal and the decoded signal; and
   a servo circuit that detects a deviation amount of an irradiation position of the light beam onto the track, from the reproduction signal, and controls the irradiation position of the optical head based on the phase error value and the deviation amount.

5. The optical disc apparatus as claimed in claim 4,
   wherein the optical head comprises:
   a dividing element that receives the reflected light, and generates a plurality of diffracted lights in a plurality of diffraction regions, from the received reflected light and
   a photodetector that receives the plurality of diffracted lights of the dividing element, and detects a plurality of reproduction signals based on respective light amounts of the plurality of received diffracted lights,
   wherein the phase error detector circuit calculates a phase error value between each of the plurality of reproduction signals and the decoded signal, and
   wherein the servo circuit controls the irradiation position based on a plurality of calculated phase error values.

6. The optical disc apparatus as claimed in claim 5,
   wherein the dividing element includes third and fourth regions symmetrically divided at forward and backward ends in a recording line direction of the track, and
   wherein the servo circuit controls a focus position of the light beam irradiated onto the track based on a difference or a division value between third and fourth phase error values, where the third phase error value is obtained from a third reproduction signal detected from the third region and the decoded signal, and the fourth phase error value is obtained from a fourth reproduction signal detected from the fourth region and the decoded signal.

7. The optical disc apparatus according to claim 5,
   wherein the dividing element includes third and fourth regions symmetrically divided at forward and backward ends in a recording line direction of the track, and
   wherein the servo circuit corrects a spherical aberration of the light beam at the irradiation position based on a difference or a division value between third and fourth phase error values, where the third phase error value is obtained from a third reproduction signal detected from the third region and the decoded signal, and the fourth phase error value is obtained from a fourth reproduction signal detected from the fourth region and the decoded signal.

8. An optical disc apparatus reproducing information recorded on a track of an optical disc, the optical disc apparatus comprising:
- an optical head that irradiates a light beam onto the track, detects a reflected light reflected by the track, and generates a reproduction signal based on the reflected light;
- a decoder circuit that decodes the reproduction signal, and generates a decoded signal including information recorded on the track;
- a correlation detector circuit that calculates a cross-correlation value between the reproduction signal and the decoded signal;
- a phase error detector circuit calculating a phase error value between the reproduction signal and the decoded signal; and
- a servo circuit that detects a deviation amount of an irradiation position of the light beam onto the track, from the reproduction signal, and controls the irradiation position of the optical head based on the cross-correlation value, the phase error value, and the deviation amount.

9. The optical disc apparatus according to claim 8, wherein the optical head comprises:
- a dividing element that receives the reflected light, and generates a plurality of diffracted lights in a plurality of diffraction regions, from the received reflected light; and
- a photodetector that receives the plurality of diffracted lights of the dividing element, and detects a plurality of reproduction signals based on respective light amounts of the plurality of received diffracted lights, wherein the correlation detector circuit calculates a cross-correlation value between each of the plurality of reproduction signals and the decoded signal, wherein the phase error detector circuit calculates a phase error value between each of the plurality of reproduction signals and the decoded signal, and wherein the servo circuit controls the irradiation position based on a plurality of calculated phase error values and a plurality of calculated cross-correlation values.

10. The optical disc apparatus according to claim 9, wherein the dividing element includes first and second regions symmetrically divided in a direction perpendicular to a recording line direction of the track as well as third and fourth regions symmetrically divided at forward and backward ends in the recording line direction of the track, wherein the servo circuit controls the irradiation position in the direction perpendicular to the recording line direction of the track based on a difference or a division value between first and second cross-correlation values, where the first cross-correlation value is obtained from a first reproduction signal detected from the first region and the decoded signal, and the second cross-correlation value is obtained from a second reproduction signal detected from the second region and the decoded signal, and wherein the servo circuit performs at least one of a control of a focus position of the light beam irradiated onto the track, and a correction of a spherical aberration of the light beam at the irradiation position, based on a difference or a division value between third and fourth phase error values, where the third phase error value is obtained from a third reproduction signal detected from the third region and the decoded signal, and the fourth phase error value is obtained from a fourth reproduction signal detected from the fourth region and the decoded signal.

\* \* \* \* \*